US009098118B2

(12) United States Patent
Kodama

(10) Patent No.: US 9,098,118 B2
(45) Date of Patent: Aug. 4, 2015

(54) COMPUTER KEYBOARD WITH POINTER CONTROL

(76) Inventor: Robert R. Kodama, Seattle, WA (US)

(*) Notice: Subject to any disclaimer, the term of this patent is extended or adjusted under 35 U.S.C. 154(b) by 1184 days.

(21) Appl. No.: 13/043,362

(22) Filed: Mar. 8, 2011

(65) Prior Publication Data

US 2011/0210918 A1 Sep. 1, 2011

Related U.S. Application Data

(63) Continuation-in-part of application No. 11/254,452, filed on Oct. 20, 2005, now Pat. No. 7,903,088.

(60) Provisional application No. 60/621,006, filed on Oct. 20, 2004.

(51) Int. Cl.
G06F 3/02 (2006.01)
G09G 5/00 (2006.01)
G06F 3/0354 (2013.01)

(52) U.S. Cl.
CPC .......... *G06F 3/0213* (2013.01); *G06F 3/03543* (2013.01); *G06F 3/03549* (2013.01)

(58) Field of Classification Search
CPC .... G06F 3/0202; G06F 3/0219; G06F 3/0213
USPC ................................ 345/156–173; 341/21–23
See application file for complete search history.

(56) References Cited

U.S. PATENT DOCUMENTS

| | | | |
|---|---|---|---|
| 5,119,078 A | 6/1992 | Grant | 340/711 |
| 5,269,004 A | 12/1993 | Comerford et al. | 395/275 |
| 5,410,333 A | 4/1995 | Conway | 345/169 |
| 5,416,730 A | 5/1995 | Lookofsky | 364/708.1 |
| 5,561,445 A | 10/1996 | Miwa et al. | 345/163 |
| 5,585,823 A | 12/1996 | Duchon et al. | 345/163 |
| 5,675,361 A | 10/1997 | Santilli | 345/168 |
| 5,694,123 A | 12/1997 | Selker et al. | 341/22 |
| 5,867,808 A | 2/1999 | Selker et al. | 702/41 |
| 5,936,555 A | 8/1999 | Zagnoev | 341/22 |
| 6,046,728 A | 4/2000 | Hume et al. | 345/157 |
| 6,057,540 A | 5/2000 | Gordon et al. | 250/221 |
| 6,088,022 A | 7/2000 | Rakoski | 345/168 |
| 6,100,875 A | 8/2000 | Goodman et al. | 345/163 |

(Continued)

OTHER PUBLICATIONS

Boege, W., Designer; Yanko Design, "World's Largest Mouse," http://www.yankodesign.com/2008/10/30/worlds-largest-mouse/, download date Nov. 5, 2008.

(Continued)

*Primary Examiner* — Kimnhung Nguyen
(74) *Attorney, Agent, or Firm* — Seed IP Law Group PLLC

(57) ABSTRACT

A computer pointer control device includes a support base and a keyboard. The device includes a structure configured to reduce friction between the support base and an underlying surface. A wrist support is positioned on the support base, configured to receive a user's wrist thereon such that keys of the keyboard are under the fingers of the user's hand, while the user is able to slide the device over the underlying surface by applying lateral pressure to the wrist support. A position tracking mechanism coupled to the device detects horizontal movement of the base over the underlying surface and transmit a signal to an associated computer to control an on-screen pointer. The keyboard includes a column of special use keys between the right- and left-hand keys, for easy access to selected functions.

10 Claims, 10 Drawing Sheets

(56) References Cited

U.S. PATENT DOCUMENTS

| | | | |
|---|---|---|---|
| 6,243,258 B1 | 6/2001 | Paratore | 361/680 |
| 6,271,834 B1 | 8/2001 | May et al. | 345/168 |
| 6,424,338 B1 | 7/2002 | Anderson | 345/173 |
| 6,545,664 B1 | 4/2003 | Kim | 345/158 |
| 6,614,421 B1 | 9/2003 | Selker et al. | 345/168 |
| 6,697,054 B1 | 2/2004 | Kamizono | 345/168 |
| 6,712,533 B2 | 3/2004 | Chen | 400/472 |
| 6,727,829 B2 | 4/2004 | Jam | 341/20 |
| 6,753,850 B2 | 6/2004 | Poole | 345/161 |
| 7,318,109 B2 * | 1/2008 | Liscano et al. | 709/244 |
| 7,414,614 B2 * | 8/2008 | Hannay | 345/169 |
| 2003/0103791 A1 | 6/2003 | Chen | 400/472 |
| 2003/0206154 A1 | 11/2003 | Hill et al. | 345/168 |
| 2004/0008186 A1 | 1/2004 | McAlindon | 345/168 |
| 2004/0196260 A1 | 10/2004 | Lin et al. | 345/161 |
| 2004/0196264 A1 | 10/2004 | Criscione | 345/168 |
| 2006/0055675 A1 | 3/2006 | Wilk et al. | 345/168 |

OTHER PUBLICATIONS

IP.com Prior Art Database, "Mouseboard," http://www.priorartdatabase.com/IPCOM/000033204/, download date Jan. 19, 2007.

* cited by examiner

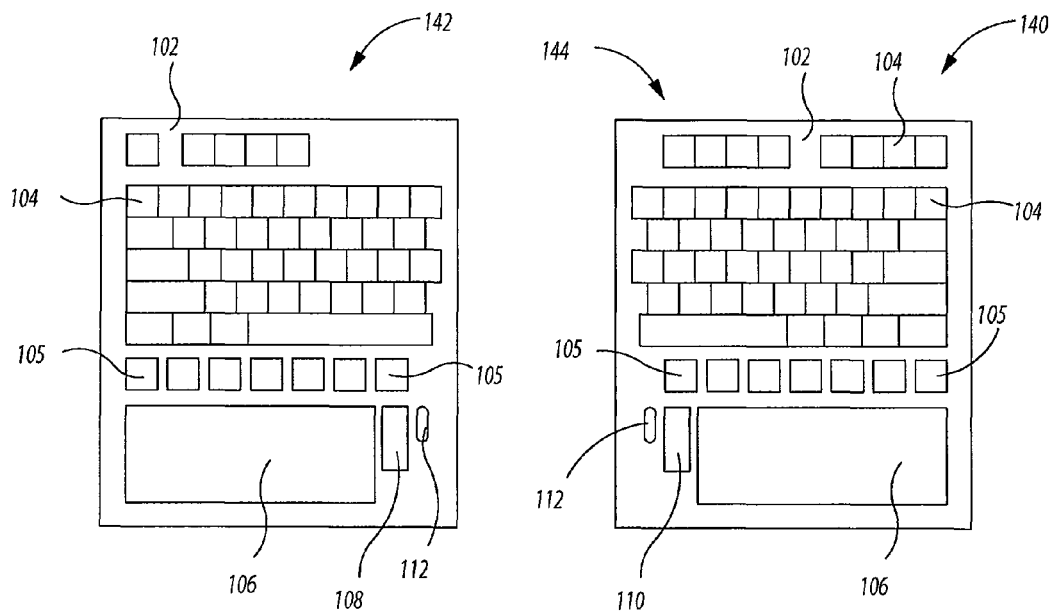
Figure 6
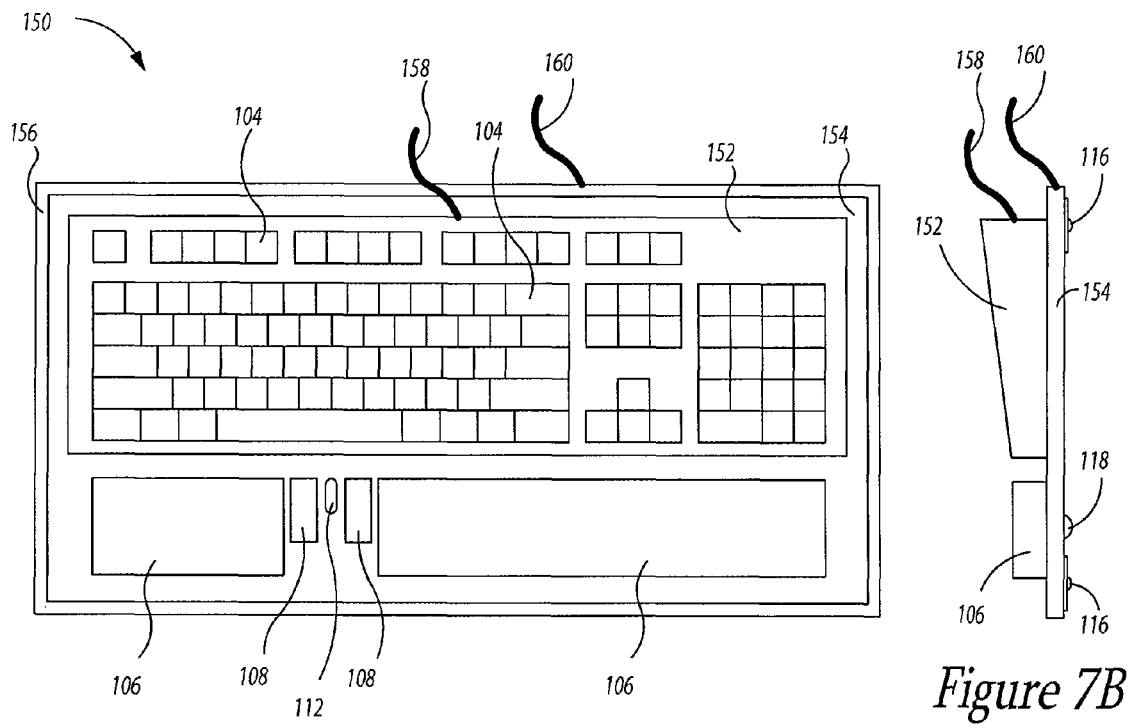
Figure 7A
Figure 7B

COMPUTER KEYBOARD WITH POINTER CONTROL

CROSS-REFERENCE TO RELATED APPLICATION

This application is a Continuation-in-Part of patent application Ser. No. 11/245,542, which claims the benefit under 35 U.S.C. §119(e) of U.S. Provisional Patent Application No. 60/621,006 filed Oct. 20, 2004. Both applications are incorporated herein by reference in their entireties.

BACKGROUND OF THE INVENTION

1. Field of the Invention

This invention relates generally to the field of onscreen pointer control for computers, and in particular to devices that incorporate pointer control into a keyboard.

2. Description of the Related Art

Video pointer control devices are commonly used in most personal computer systems and workstations to manipulate an onscreen pointer. Mice are the best known and most common such devices. Most mice fall into two general categories: mechanical and optical. A mechanical mouse employs a roller ball positioned in an aperture in a lower surface of the mouse. The device is configured such that, as the mouse traverses a flat underlying surface, the roller ball rotates inside the mouse. Mechanical and/or optical systems within the mouse detect rotation of the ball in two axes and translate the detected rotation into signals that are transmitted to the computer, which in turn moves a pointer on the screen in accordance with the detected rotation. Such mechanical mouse pointer control devices have been in common use for many years.

Optical mouse pointers are a more recent development. Such a device employs a light emitter and an optical sensor positioned in close proximity to each other on the lower side of the mouse. The emitter, a light emitting diode (LED), for example, illuminates the surface beneath the mouse. As the mouse is moved by a user, the optical sensor detects the movement as variations in the reflected light, in the two axes. This is again transmitted to the computer where an onscreen pointer moves in response.

Another pointer control device includes a gyroscopic sensor configured to detect movement of the device, without reference to an underlying surface, such that it may be operated in free space.

While the mouse is the most common, other types of pointer control devices have come into use for applications where a mouse is impractical. For example, a trackball is a device in which a roller ball is positioned on an upper surface of the device, such that a user manipulates the ball directly to generate a control signal for the screen pointer. Trackballs do not require as much space, since they are stationary. In some cases, the trackball housing is attached to a computer keyboard, or, in the case of some notebook style computers, integrated into a front portion thereof. In other systems, especially of the notebook style, a touch sensitive pad is integrated into the keyboard, or a small knob is positioned between keys of the keyboard. In the latter device, a user presses against the knob to generate the control signals.

Control of an on-screen pointer or cursor may also be carried out via keys of a computer keyboard. For example the arrow keys may be employed in some cases. Additionally, the combined use of the ALT or CTRL keys with other keys, sometimes referred to as chording, may also affect cursor movement, placement, page scrolling, etc.

BRIEF SUMMARY OF THE INVENTION

According to an embodiment of the invention, a computer pointer control device is provided, comprising a housing with computer keys positioned on the housing. The device includes one or more structures configured to reduce friction between the housing and an underlying surface on which the housing is resting. A wrist support is positioned on an upper surface of the housing, configured to receive a user's wrist thereon in a manner such that the keys of the keyboard are under the fingers of the user's hand, while the user is able to slide the device over the underlying surface by applying lateral pressure to the wrist support.

The device may be configured to receive both of a user's wrists and include a substantially complete alphabetical keyboard, or may be one of a pair of similar pointer control devices and be configured to receive only one of the user's wrists, such that each device includes a portion of a complete keyboard and is independently controlled by the user.

A position tracking mechanism coupled to the device is configured to detect horizontal movement of the housing over the underlying surface. The tracking mechanism may be an integral component of the housing, or it may be a separate tracking device, such as a mouse, docked to the housing. The tracking mechanism is configured to transmit a signal to an associated computer to control an on-screen pointer.

The keyboard may be integrated with the position tracking mechanism as a unitary structure, or, in accordance with an alternate embodiment, the keyboard may be removably positioned on a base.

Another embodiment includes a game controller having a tracking mechanism configured such that movement of the controller over an underlying surface is detected by the tracking mechanism, the mechanism further configured to transmit data related to the detected movement to an associated game system.

A further embodiment includes an electronic device having a tracking mechanism configured to detect movement of the electronic device over an underlying surface. According to various alternate embodiments, the electronic device may be any of a variety of types of devices, including notebook computer, a personal digital assistant, a cellular telephone, a portable game player, a digital media player, and a pocket computer.

BRIEF DESCRIPTION OF THE SEVERAL VIEWS OF THE DRAWING(S)

In the drawings, identical reference numbers identify similar elements or acts.

FIGS. 4-7A each illustrates an additional embodiment of the invention.

FIG. 7B shows a side view of the embodiment of FIG. 7A.

FIGS. 8-17 illustrate additional embodiments of the invention.

DETAILED DESCRIPTION OF THE INVENTION

In the following description, certain specific details are set forth in order to provide a thorough understanding of various embodiments of the invention. However, one skilled in the art will understand that the invention may be practiced without these details.

While many pointer control devices are in common use at the present time, most suffer from one shortcoming in particular. In order to manipulate the device, the user must move a hand from the keyboard. A touch typist, for example, must interrupt a stream of typing in order to do this. Depending on the amount of pointer manipulation required, this can represent a significant impact on productivity.

Figure 1:
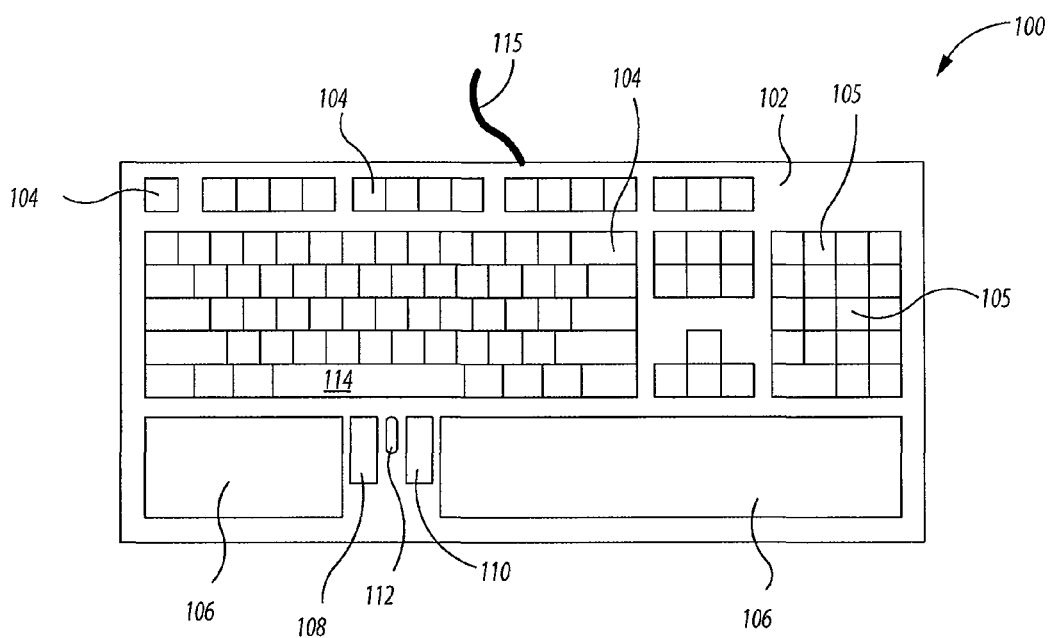
FIG. 1 shows a computer keyboard according to a first embodiment of the invention, in plan view.

FIG. 1 illustrates a computer keyboard including a pointer control device, according to a first embodiment of the invention. The keyboard 100 includes a housing 102 and a plurality of computer keys 104, arranged as may be found on most common computer keyboards. The space bar 114 is indicated separately for clarity. Numeric keys 105 are also shown in a typical arrangement. The keyboard 100 further includes wrist support pads 106 configured to receive a user's wrist for resting thereon. In addition, click buttons 108, 110 and scrolling wheel 112 are configured to operate in a manner similar to the left and right click buttons and scrolling wheel of a typical computer mouse, respectively. A control cable 115 is configured to transmit control signals to a computer.

Figure 2:
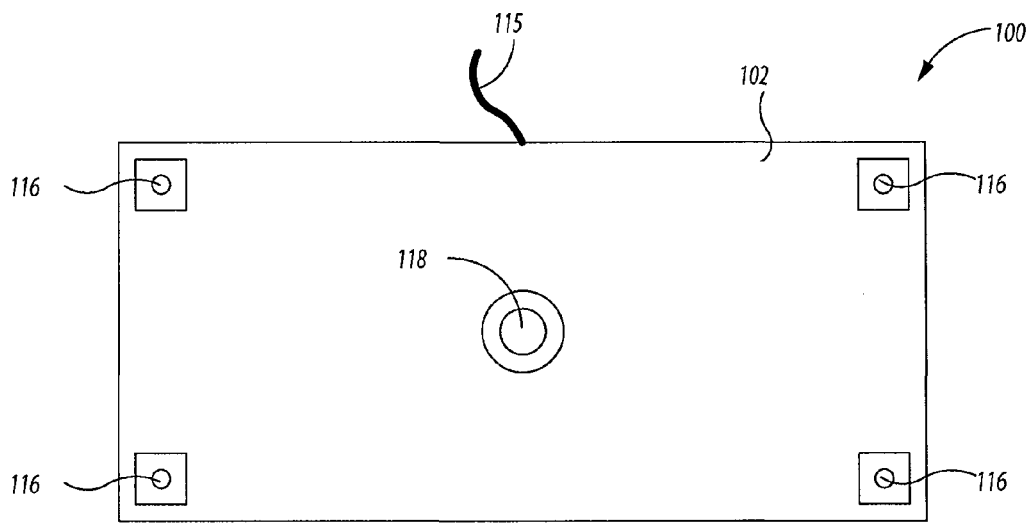
FIG. 2 shows a bottom surface of the keyboard of FIG. 1.
Figure 3:
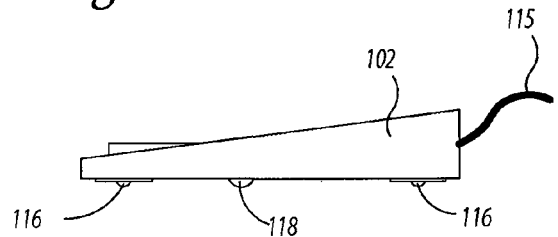
FIG. 3 shows a side view of the keyboard of FIG. 1.

FIG. 2 shows a bottom view of the computer keyboard 100, while FIG. 3 shows a side view thereof. The computer keyboard 100 includes a plurality of friction reduction mechanisms 116 configured such that, when the computer keyboard 100 is placed on a smooth surface, the keyboard 100 slides easily in any direction along the surface. The keyboard 100 also includes a position tracking mechanism 118, configured to track the movement of the keyboard 100 in two axes of movement relative to an underlying surface, in a manner similar to the tracking mechanisms of typical mouse pointer devices.

The friction reduction mechanisms 116 are shown as roller balls. However, it will be recognized that there is a wide variety of devices and mechanisms that may be employed to fulfill the function of the friction reduction mechanisms 116. For example, the bottom surface of the housing 102 of the keyboard 100 may be provided with a plurality of low-friction blocks, such as Teflon™ or other suitable material. Alternatively, a large percentage of the lower surface of the keyboard 100 may have a thin sheet or coating of a low friction material such as Teflon™. According to another embodiment, the keyboard 100 is provided with a plurality of much smaller ball bearings configured to perform the same function. These and other friction reduction mechanisms fall within the scope of the invention.

The position tracking mechanism 118 is shown comprising a roller ball, whose function is well known in the art in connection with its use in typical mouse pointer devices. Nevertheless, other systems and devices configured to detect movement and relative position are also well known in the art, and include optical tracking devices, such as have been described above. Other position tracking or motion sensing systems also include the use of hall effect sensors, gyroscopes, direct mechanical feedback systems, inductively coupled devices such as digitizing tablets and pens, etc. Any structure or device capable of providing pointer position and movement control signals to a computer is considered to fall within the scope of the invention.

In operation, an operator places one or both of his hands such that his wrists or hands are supported by the pads 106, and such that his thumbs are positioned near the spacebar 114 and click buttons 108, 110. In this position, the operator is free to type on the keyboard 100, striking the keys 104, 114 in a known manner, as required. In addition, the operator is able to independently control the position of an onscreen pointer, such as that typically associated with common mouse pointer devices, simply by moving his hands cooperatively such that the pressure of his wrists on the pads 106 causes the keyboard 100 to slide on the underlying surface upon which it is resting. The position tracking mechanism 118 detects movement of the keyboard 100 relative to the underlying surface, and translates that movement to signals that are provided to the computer for positioning of the pointer. With the operator's thumbs positioned near the click keys 108, 110, the operator can easily manipulate the keys 108, 110, and the scroll wheel 112 without repositioning his hands. In this way, the functions of a typical computer mouse and a typical computer keyboard are combined into the keyboard 100 in a manner that permits an operator to control both functions without repositioning his hands from the keyboard.

The computer keyboard 100 is shown having a control cable 115 configured to transmit operating control data to the computer in a known manner. It will be recognized that the computer keyboard 100 may also be configured to operate using wireless technology such as is well known in the art, in which case, the device will not require a control cable 115.

Figure 4:
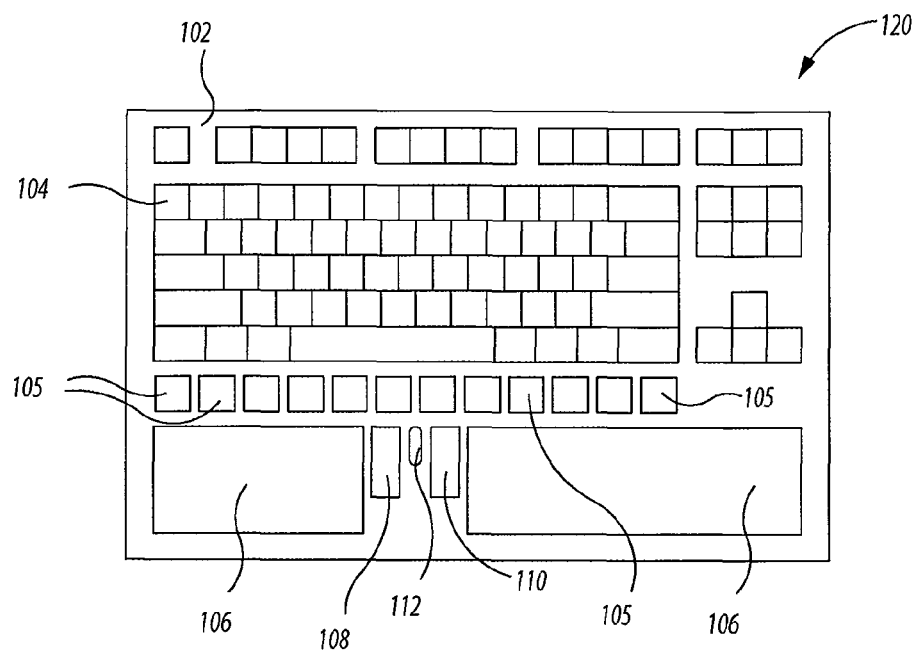
Figure 5:
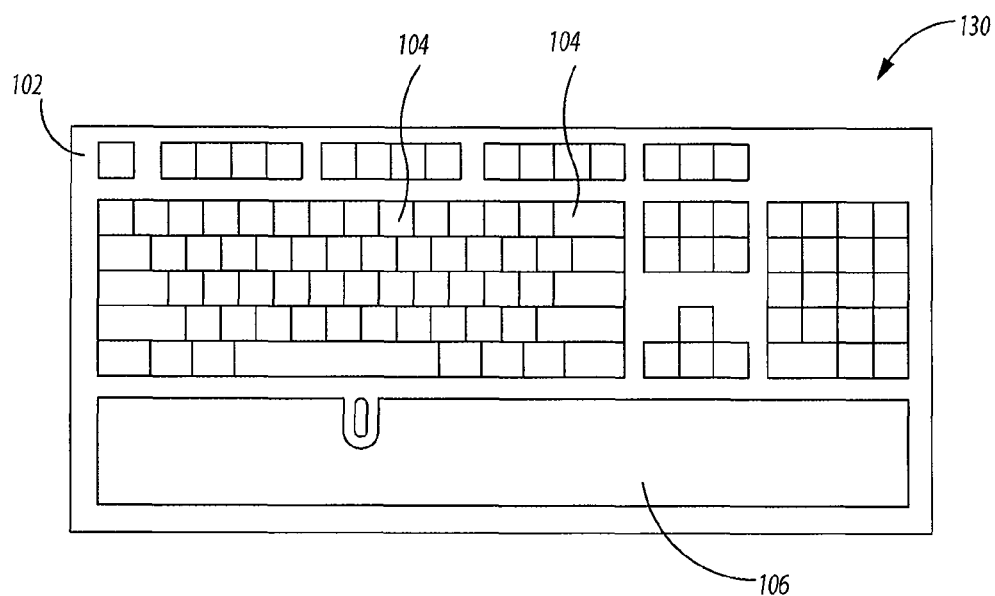

FIGS. 4-6 illustrate various computer keyboard configurations according to additional embodiments of the invention. Referring to FIG. 4, a computer keyboard 120 is shown, in which the numeric keys 105 are arranged between the wrist support pads 106 and the alphabetical keys 104, including the spacebar 114. In the configuration of the keyboard 120, the dimensions of the overall keyboard are reduced, and the various keys of the keyboard are placed closer to an operator's normal rest position. This further reduces the need, on the part of the operator, to reach away from the normal finger positions on the keyboard 120. This configuration is especially beneficial in applications where the numerical keys are in frequent use.

According to the embodiment of FIG. 5, the keyboard 130 is not provided with click buttons such as buttons 108, 110 of FIG. 4. Instead, the computer has software configured to recognize the functions of a typical mouse click button such that, when particular ones of the keys 104, or combinations of the keys 104, are struck by the operator, the associated computer is configured to respond as though one or another mouse click key had been pressed. Software for enabling a computer to operate as described is well known in the art. For example, U.S. Pat. No. 6,469,694, issued to Mikan, discloses one such software scheme. It is within the scope of abilities of one having ordinary skill in the art to provide other programs for this purpose. In this embodiment, a single wrist support pad 106 is positioned across the bottom of the keyboard, with a scroll wheel 112 embedded. In another embodiment, the scroll wheel is also eliminated, with its function being provided by other keys or chords of key, or eliminated entirely.

According to an embodiment not pictured, the scrolling wheel 112 is also not provided.

The keyboards 120 and 130 are each provided with friction reduction mechanisms and position tracking mechanisms similar to the devices described with reference to the embodiment of FIGS. 1-3.

With reference to FIG. 6, an embodiment is illustrated in which the keyboard 140 comprises two keyboard segments 142, 144, each having a housing 102 and a plurality of keys 104. Each keyboard segment 142, 144 is also provided with a wrist support pad 106, and a single click key 108, 110, respectively. Each segment 142, 144 may be provided with a scroll wheel 112, as shown. Alternatively, a scroll wheel 112 may be provided on only one, or neither of the segments. According to another alternate embodiment, one or both of the segments 142, 144 is provided with two click keys 108, 110, such that an operator may invoke either function with either hand.

Each keyboard segment 142, 144 is provided with a plurality of friction reduction mechanisms, such as those described with reference to FIGS. 2 and 3. Each segment 142, 144 is also provided with a position tracking mechanism, such as the mechanism 118 described with reference to FIGS. 2 and 3, for tracking movement of the respective segment relative to an underlying surface.

Divided keyboards, in which all the keys of a typical computer keyboard are distributed between two keyboard segments, are well known in the art. Such a configuration permits a user to position the keyboard segments in a manner that is ergonomically appropriate for the particular user.

The embodiment of FIG. 6 provides a user with the ergonomic advantages of a separated keyboard, as well as the ability to manipulate an onscreen pointer without moving one's hands from the keyboard. By placing his left wrist on the wrist support pad 106 of the segment 142, and his right wrist on the wrist support pad 106 of keyboard segment 144, an operator can move an on-screen pointer with movements of either hand. Alternatively, in cooperation with the keyboard 140 of FIG. 6, a user's computer may be provided with an additional onscreen pointer, such that the operator is able to manipulate the position and operation of separate pointers with each hand. It is within the abilities of one having ordinary skill in the art to create software to support such an embodiment.

In FIGS. 1 and 4-6, various configurations of keyboards have been disclosed. The inventor has not attempted to disclose all possible keyboard configurations, but merely to demonstrate a few of the many possible configurations that may be employed. Accordingly, the scope of the invention is not limited to the configurations depicted herein, but includes any configuration of keyboard, inasmuch as such variations are a matter of convenience for a particular use or application. For example, other configurations may include one or more resting surfaces, such as finger wells, configured to receive the users fingers when not engaged in typing. Additionally, other active components or input devices may be included, such as touch pads, for example.

Referring now to FIGS. 7A and 7B, a pointer control device 150 is illustrated in plan and side view, respectively, according to another embodiment of the invention. The pointer control device 150 includes a support base 154 configured to receive thereon a computer keyboard 152, or a notebook computer, such as are commonly known in the art. The support base 154 includes wrist support pads 106, click buttons 108, 110, and a scroll wheel 112. A low ridge 156 is provided around a perimeter of the support base 154 to prevent the keyboard 152 from sliding off the support base 154 during operation. As may be seen in the side view 7B, the pointer control device 150 further includes friction reduction mechanisms 116 and a position tracking mechanism 118 to track movement of the support base over an underlying surface. The pointer control device 150 also includes a control cable 160, separate from the control cable 158 provided with the keyboard 152. The control cable 160 is configured to be coupled with the computer port normally configured to receive a mouse control cable. The pointer control device 150 is configured to operate in a manner similar to that described with reference to the embodiment of FIGS. 1-3, except that it is configured to receive an ordinary keyboard for the operator's use. According to alternate embodiments, a non-skid surface or adhesive is provided, instead of the low ridge 156, to ensure a nonmoving contact between the keyboard 152 and base 154.

Operation of the combined pointer control device 150 and keyboard 152 is substantially identical to the operation of the keyboard 100 described with reference to FIG. 1.

Figure 8:
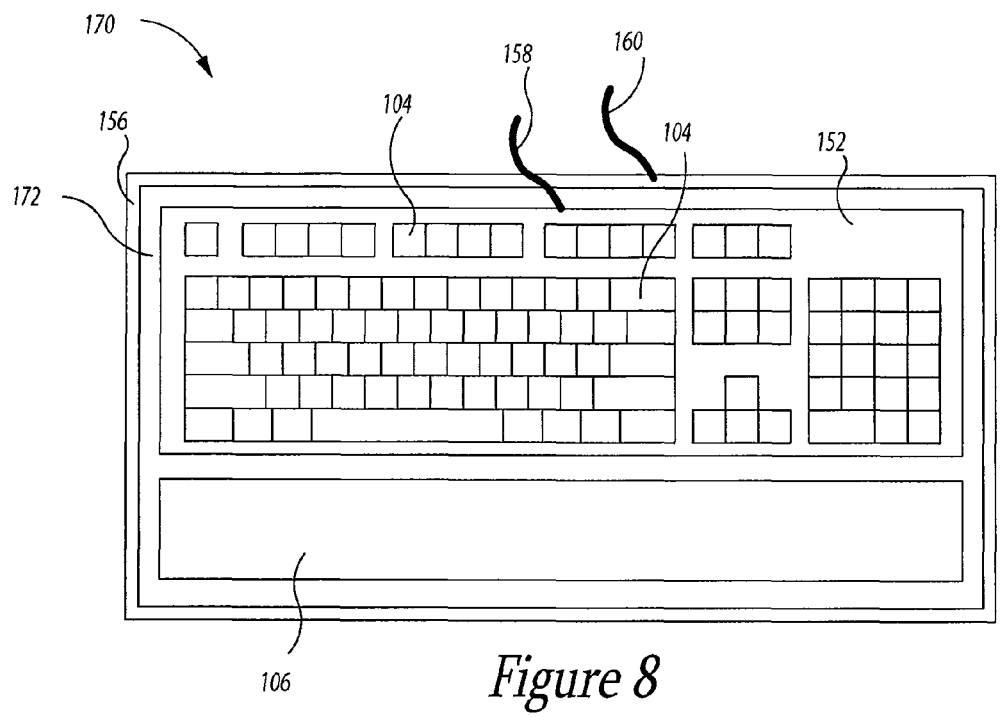

According to the embodiment of FIG. 8, a pointer control device 170 is provided, which shares many features and functions with the embodiment described with reference to FIGS. 7A and 7B. For example, a support base 172 is provided having a retaining ridge 156 and friction reduction and position tracking mechanisms 116, 118, as previously described. The pointer control device 170 may also include a wrist support pad 106 that substantially traverses the width of the support base 172. According to the embodiment of FIG. 8, mouse control buttons such as the click buttons 108, 110, and scroll wheel 112, are not provided. The device 170 is configured to receive a keyboard 152 as described with reference to FIGS. 7A and 7B, or other input device, and to be operated in a similar manner. However, the keyboard control device 170 of FIG. 8 is configured to operate in conjunction with software configured to provide the user with the ability to activate mouse key functions using the keys of a standard keyboard, such as that described with reference to FIG. 5.

Figure 9:
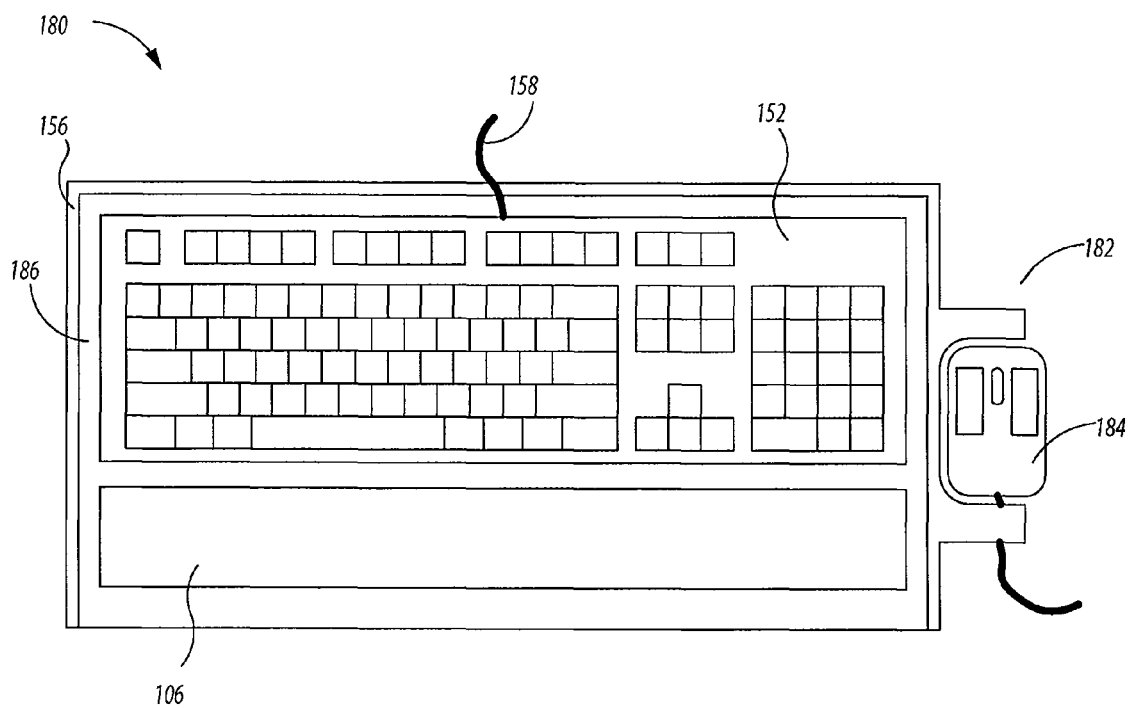

Referring now to FIG. 9, a pointer control device 180 is shown according to an additional embodiment of the invention. The mouse control device 180 is provided with a support base 186 having a wrist support pad 106, a retaining ridge 156, and configured to receive a keyboard 152, as described with reference to FIGS. 7A-8. The pointer control device 180 is also provided with friction reduction mechanisms such as those described with reference to FIGS. 1-3. However, the pointer control device 180 is not provided with a position tracking mechanism such as that described with reference to previous embodiments. Accordingly, the device 180 is passive, in the sense that there is no electronic connection between the device 180 and an associated computer. Instead, the support base 186 includes a mouse dock 182 configured to receive a standard computer mouse 184 therein.

In operation, the support base 186 receives a keyboard 152 thereon and a mouse 184 in the dock 182. An operator places his wrists on the wrist support pad 106 and is free to type on the keyboard 152 in a normal manner. At the same time, because the mouse 184 is mechanically coupled to the support base 186, movements of the pointer control device 180 over an underlying surface are detected by the mouse 184 and transmitted to the associated computer in a normal fashion. The computer associated with the pointer control device 180 may be provided with mouse emulation software such as that described with reference to previous embodiments to relieve the operator of the need to reach to press the mouse keys.

Figure 10:
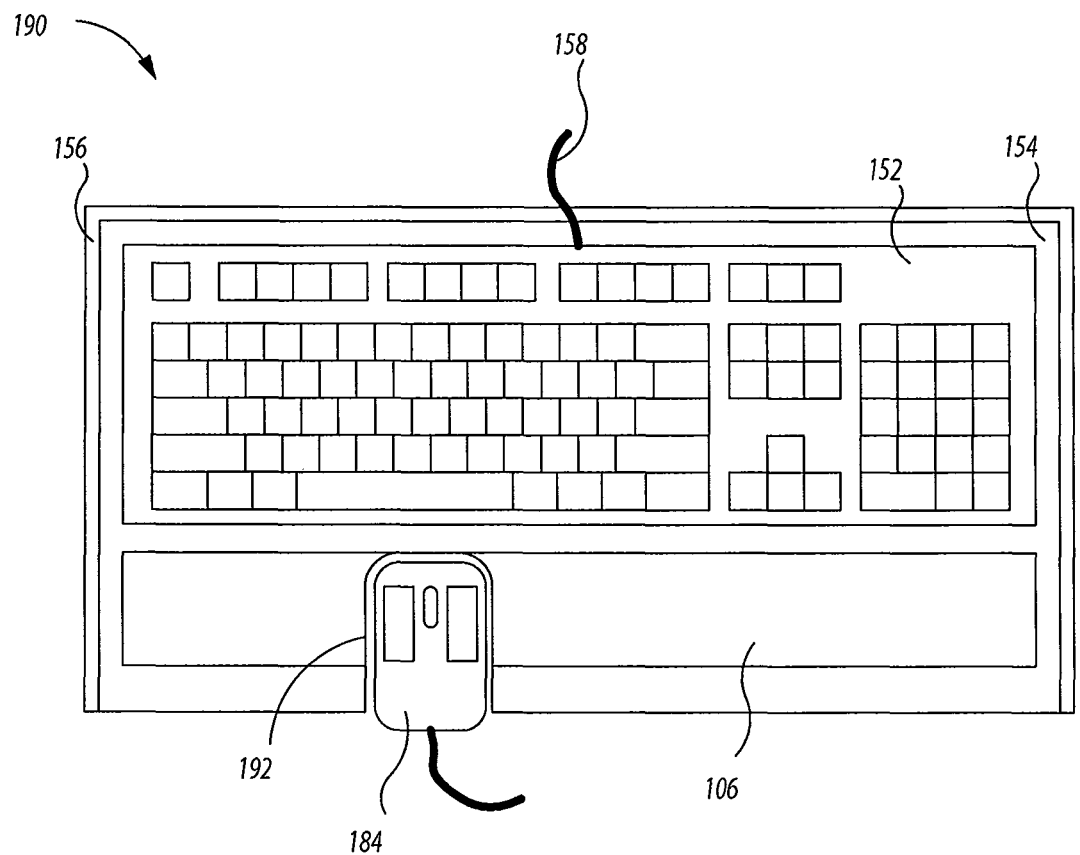

According to the embodiment of FIG. 10, the function and operation of the mouse pointer device 190 is substantially identical to that of mouse pointer device 180 of FIG. 9, with the exception that the mouse dock 192 is positioned such that the buttons of a mouse 184 docked therein are more easily accessible to an operator with his thumbs in a normal typing position.

Figure 11:
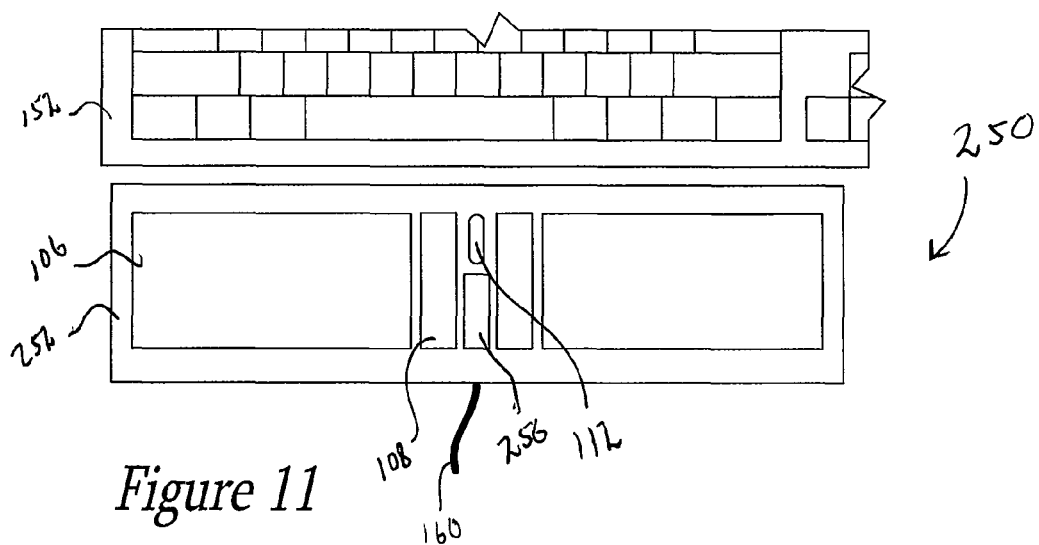

FIG. 11 shows in diagrammatic form a pointer control device 250 according to another embodiment. The pointer control device 250 includes a support base 252, wrist support 106, mouse click buttons 108, scroll wheel 112, and a tracking control button 256. The support base 252 includes friction reduction mechanisms and a position tracking mechanism on a lower surface, similar to such elements described with reference to other embodiments. The position tracking mechanism is configured to track movement of the support base 252 over an underlying surface as the support base slides or rolls on the friction reduction mechanisms. The mouse click buttons 108 and scroll wheel 112 are substantially as commonly known in the art. The tracking control button 256 controls activation and deactivation of the position tracking mechanism. The pointer control device 250 is shown with a cable 160 for coupling the device to an associated computer system, but according to other embodiments, the device can be configured to operate wirelessly, according to well known principles.

Also shown in FIG. 11 is a portion of a computer keyboard 152 such as is commonly used with a computer. While not shown, it will be understood that the keyboard and pointer control device 250 will typically be coupled to a computer system that includes a central processing unit, a memory, and a video screen, although other configurations are also possible, and fall within the scope of the invention.

According to one embodiment, an operator places his wrists or the heels of his hands on the wrist support pads 106 while operating the computer keyboard 152. Because the pointer control device 250 is not fixed to the keyboard, the user can slide the device a few inches over the underlying surface in both the X and Y axes without removing his fingers from the keys of the keyboard. He can therefore control movement of an on-screen pointer while keeping his fingers in position to continue typing. However, it will be recognized that given the limited range of motion of the pointer control device 250, movement of the pointer across the computer screen might be difficult. Where a user would normally pick up a mouse to reposition the mouse without producing a corresponding movement of the pointer, it would be impractical to pick up the pointer control device 250. Accordingly, the tracking control button 256 is provided, to enable the operator to momentarily disable the position tracking mechanism. By pressing the tracking control button 256 as the pointer control device 250 is moved, the pointer control device 250 can be moved without causing the on-screen pointer to move. The tracking control button 256 is then released to continue controlling the pointer. In this way, the on-screen pointer can be controlled to move to any location on the screen.

According to an alternate embodiment, the position tracking mechanism is normally disabled, so that pressing the tracking control button 256 enables or activates the mechanism. According to another alternate embodiment, the tracking control button 256 toggles the position tracking mechanism between an enabled condition and a disabled condition, so that each time the operator presses and releases the tracking control button, the position tracking mechanism changes operating state, from enabled to disabled or vice-versa. Finally, according to an embodiment, the operator can choose from among the three operating modes described above. Preferably, the operating mode and position tracking are controlled via a software program executed by the computer system in a manner similar to the software commonly employed to control operation of a computer mouse.

According to an embodiment, the pointer control device 250 is configured to be attached to a standard keyboard 152, so that the keyboard and pointer control device move together. An adhesive strip can be provided, to be positioned between the facing edges of the keyboard 152 and the pointer control device 250, to attach the keyboard to the device. Alternatively, a gusset can be provided, with adhesive to attach the gusset to the undersides of the keyboard 152 and the pointer control device 250, to provide a durable attachment between the keyboard and the pointer control device. With the device 250 attached to the keyboard 152, the operator moves both the keyboard 152 and pointer control device 250 over the underlying surface to control the on-screen pointer. In this configuration, operation of keyboard and device is substantially as described with reference to previously disclosed embodiments, such as the embodiment of FIGS. 1-3.

Figure 12A:
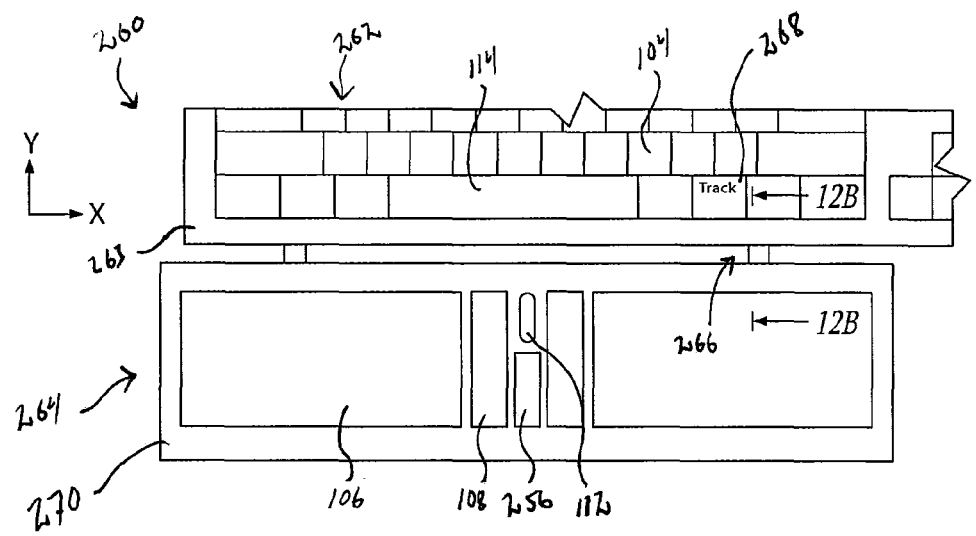
Figure 12B:
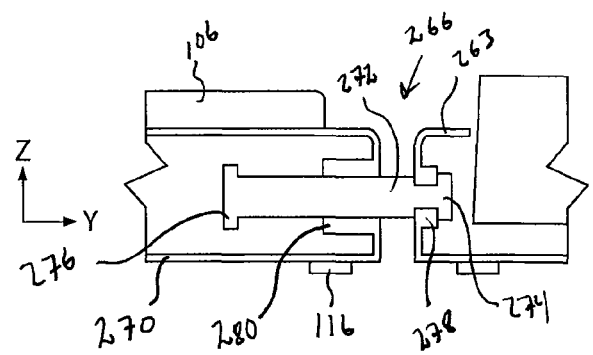

FIG. 12A is a diagrammatic plan view of a combined keyboard and pointer control mechanism 260 according to another embodiment, while FIG. 12B shows a partial cross-sectional view of the mechanism 260 of FIG. 12A, taken along the lines 12B-12B. The combined mechanism 260 includes a keyboard 262 and a pointer control device 264, tethered together by a pair of coupling mechanisms 266 that are described in more detail with reference to FIG. 12B.

The keyboard 262 includes a plurality of keys 104 and a spacebar 114, and can also include a tracking control key 268. The pointer control device 264 includes a support base 270, wrist support 106, mouse click buttons 108, scroll wheel 112, a tracking control button 256, and friction reduction mechanisms 116.

Operation of the combined keyboard and pointer control mechanism 260 by an operator is substantially identical to the operation described with reference to the pointer control device 250 of FIG. 11, with some small exceptions. First, the tracking control key 268 on the keyboard is provided, configured to control operation of a position tracking mechanism, substantially as described with reference to the tracking control button 256 of FIG. 11. The tracking control key 268 provides the operator with the option of controlling position tracking from either the keyboard 262 or the pointer control device 264. The position of the tracking control key 268 in FIG. 15A is merely exemplary, and can be at any preferred location. According to an embodiment, the operator can assign the function of the tracking control key 268 to any key of the keyboard 262.

A second difference between the combined keyboard and pointer control mechanism 260 and the pointer control device 250 of FIG. 11 is that movement of the pointer control device 264 relative to the keyboard 262 is limited by the coupling mechanisms 266. FIG. 12B is a diagrammatic cross-sectional view of a portion of the combined mechanism 260, taken along lines 12B-12B, and shows details of one of the coupling mechanisms 266.

The coupling mechanism 266 includes a track 278, an axial bearing 280, and a coupling pin 272 having first and second heads 274, 276. The track 278 is formed in the front facing surface of the housing 263 of the keyboard 262, and extends substantially the length of the keyboard. The first head 274 of the coupling pin 272 slidably engages the track 278 so as to slide laterally, relative to the keyboard 262. This permits movement of the pointer control device 264 along the X axis relative to the keyboard 262. The axial bearing 280 is formed in the support base 270 of the pointer control device 264. The coupling pin 272 is received by the axial bearing 280 and is axially slidable within the bearing between the limits established by the second head 276 of the pin, at one extreme, and by contact of the pointer control device 264 with the housing 263 of the keyboard 262 at the other extreme. In practice, because the keyboard normally remains substantially stationary while the pointer control device 264 is moved to control pointer position, the axial bearing 280 generally slides on the coupling pin 272 during operation. Movement of the axial bearing 280 on the coupling pin 272 permits movement of the pointer control device 264 along the Y axis, relative to the keyboard 262.

Tracking of the movement of the pointer control device 264 can be provided by a position tracking mechanism on the bottom of the support base 270, such as has been described with reference to previous embodiments. According to an alternative embodiment, encoders are provided that detect movement of the coupling pin 272 in the track 278 and the axial bearing 280, and thereby track changes in the relative positions of the pointer control device 264 and the keyboard 262.

The coupling pin 272 can be cylindrical, as suggested in FIGS. 12A and 12B, or it can have other shapes. For example, the coupling pin 272 can have a wide, flat shape, to reduce stress on the track 278 and bearing 280. Additionally, the track 278 and bearing 280 can be strengthened and reinforced so that the pointer control device 264 can cantilever over the edge of a desktop or keyboard tray and support the weight of the operator's arms resting thereon.

Other coupling and tracking mechanisms can also be employed, according to respective embodiments, to couple the keyboard 262 and the pointer control device 264, and to track relative movement.

While, according some embodiments, the position tracking mechanism of the combined device 260 is configured to track movement of the pointer control device 264 relative to the keyboard 262, such a mechanism can be regarded as equivalent to a position tracking mechanism that tracks movement of a pointer control device relative to an underlying surface, because, with regard to the combined device, the keyboard defines the position of the underlying surface.

Figure 13A:
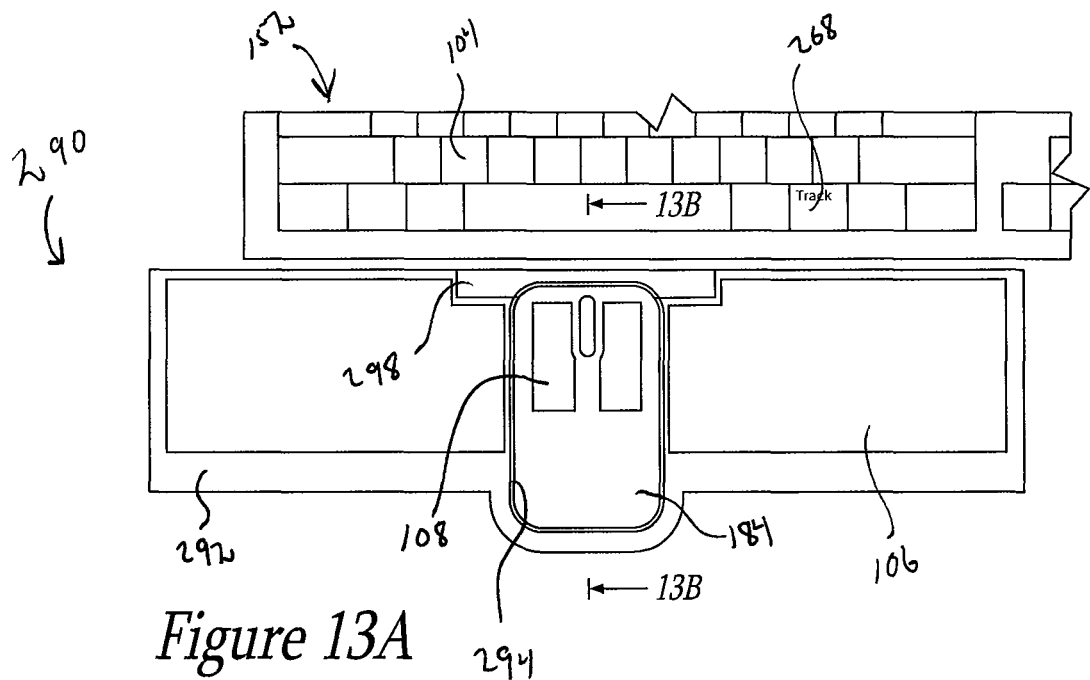
Figure 13B:
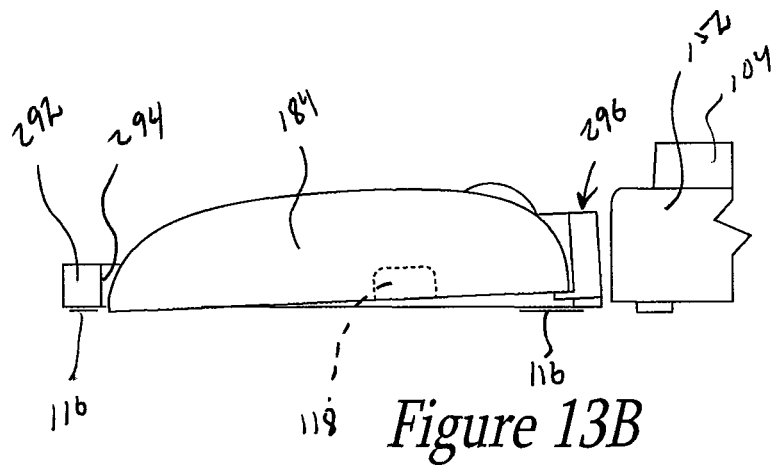

FIGS. 13A and 13B are diagrammatic plan and side views, respectively, of a pointer control device 290 according to another embodiment. The side view of FIG. 13B is in partial cross section, taken along lines 13B-13B of FIG. 13A. The pointer control device 290 includes a support base 292 and a mouse dock 294.

In operation, an operator places a computer mouse 184 in the mouse dock 294 so that movement of the pointer control device 290 is detected by the tracking mechanism 118 of the mouse. With the operator's wrists on the wrist pads 254, the click buttons 108 of the mouse are accessible for access by the operator thumbs or forefingers. According to an embodiment, software is provided with the pointer control device 290, configured to permit the operator to configure one of the keys 104 of the keyboard 152 to function as a tracking control key 268. This permits the operator to enable and disable the position tracking function of the mouse 184 as described previously with reference to the key 268 of FIG. 12A.

According to another embodiment, the pointer control device 290 includes a vertical position control 296 to raise and lower the mouse 184, as shown in FIG. 13B. In the embodiment shown, the vertical position control 296 engages the front, or nose of the mouse 184, and normally holds the nose of the mouse about a centimeter above the underlying surface. This distance is generally sufficient to prevent the optical position tracking mechanism 118 of the mouse from detecting movement of the mouse over the underlying surface. Pressure on a touch bar 298 lowers the mouse 184 to contact the underlying surface and permits the tracking mechanism 118 to detect and track movement of the mouse. Thus, the mouse is normally disabled, and the operator can enable and disable the tracking mechanism 118 by pressing and releasing the touch bar 298. The vertical position control 296 can be provided with a simple spring mechanism for operation, such as is within the abilities of one of ordinary skill to design. According to another embodiment, pressure on the touch bar 298 operates a lever mechanism that lifts the mouse from the underlying surface, so that the mouse is normally enabled, while the operator can disable and enable the mouse by pressing and releasing the touch bar 298.

During normal operation of a computer mouse, a right-handed operator generally uses the left-click mouse button as the primary button. However, when a mouse is docked in the mouse dock 294, the operator's right hand is closest to the right-click button. Accordingly, the computer mouse 184 can be reconfigured to switch operation of the right- and left-click buttons, using software provided with the pointer control device 290 or standard mouse control software.

Figure 14A:
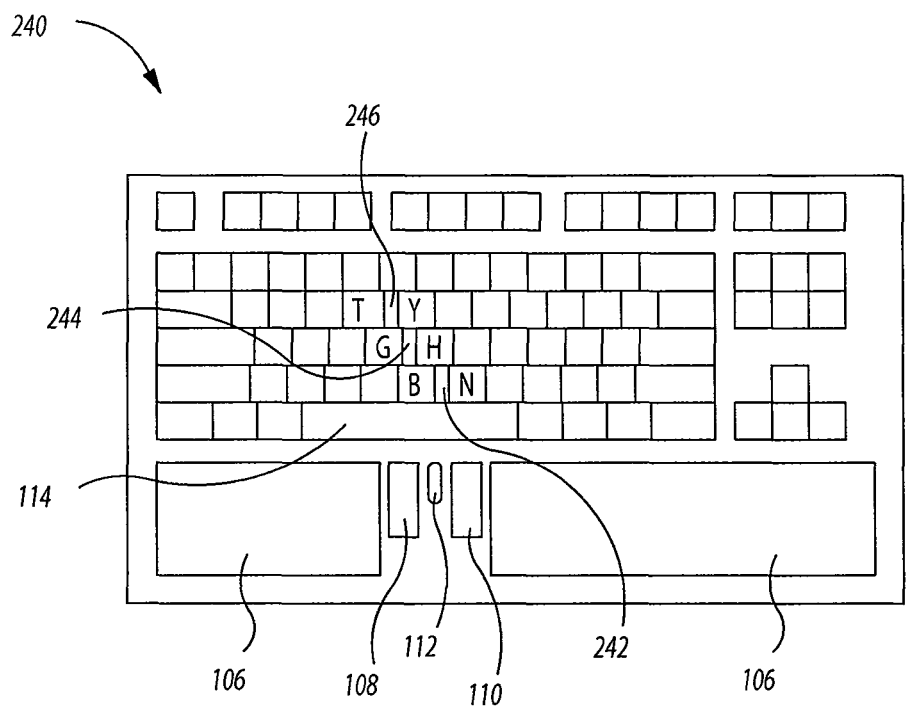
Figure 14B:
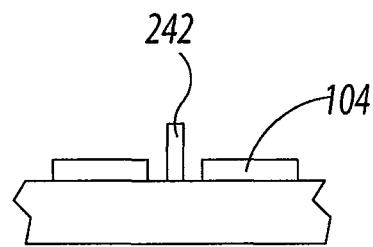

An embodiment of the invention is illustrated with reference to FIGS. 14A and 14B, in which a computer keyboard 240 is provided with special operation keys, including an Alt or Esc key 242, a Cntrl or Del key 244, and a Back Space key 246 positioned near the center of the keyboard 240. By placing the special operation keys between the groups of keys 104 normally struck by the right and left hands, these keys are easily accessible by either hand without interfering with normal typing operation. The Back Space key 246 is also typically a very heavily used key, and is thus also positioned centrally. In other respects, the keyboard 240 operates in a manner similar to other embodiments, being provided with means for tracking the position of the keyboard 240 relative to an underlying surface for pointer control. In known devices, these keys are commonly positioned near the perimeter of the keyboard. However, in applications where chording functions are heavily used, an operator is obliged to move his hands to the outer keys for these operations, which slows the operation, and requires greater effort on the part of the operator.

In the illustrated configuration, the special operation keys 242, 246, 248, are narrow to minimize their impact on the spacing of the other keys 104. They are also raised above the level of the other keys 104 of the keyboard, as shown in FIG. 14B. This makes it possible for the operator to easily find the keys and to avoid striking them accidentally.

In alternate embodiments, any of the Alt, Esc, Cntrl, Del, and Back Space keys 242, 246, 248, as well as any other keys that might be advantageously repositioned, may be located in the positions described above, or in other positions that are convenient to an operator's fingers during a typing operation. For example, such keys may be positioned between the wrist support pad 106 and the space bar 114, or in the space normally occupied by mouse click buttons.

Figure 15:
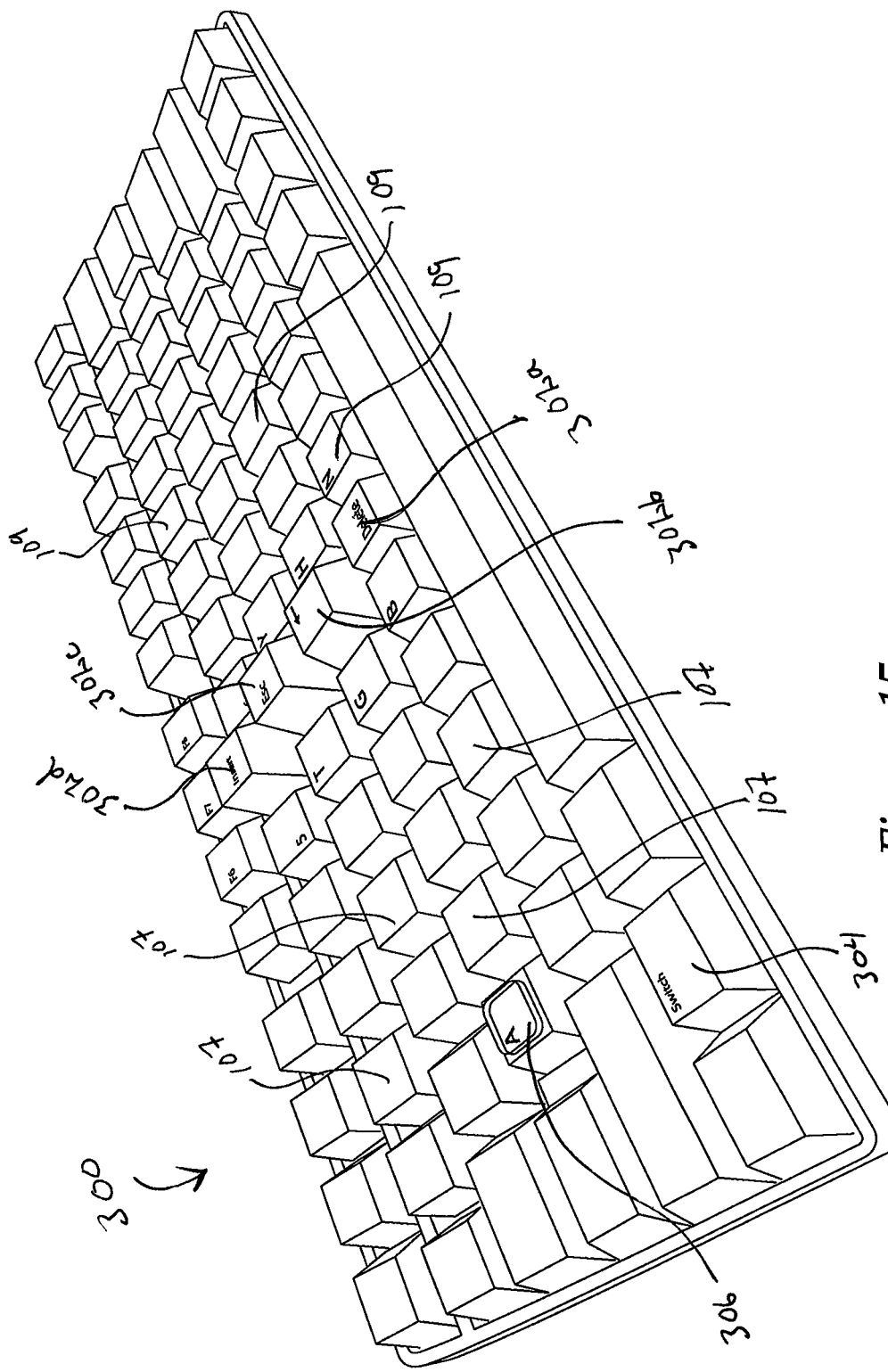

FIG. 15 is a three-dimensional view of a computer keyboard 300 according to an embodiment. The keyboard 300 includes a housing 301 with a first plurality of keys 107 that are positioned for access by a user's left hand, a second plurality of keys 109 that are positioned for access by a user's right hand, and a column of special operation keys 302 that are positioned between the first and second pluralities of keys. As with the embodiment of FIGS. 14A and 14B, the special operation keys 302 are raised above the height of the keys of the first and second pluralities in their respective rows. Additionally, according to an embodiment, the special operation key 302b, in the second row, is slightly taller than the key 302a in the first row, while the special operation key 302c, in the third row, is slightly taller than the key 302b, etc. The arrangement and heights of the special operation keys 302 enable the operator to find each of the keys by touch, and also assist in quickly locating the other keys of the keyboard.

While the special operation keys 302 are shown, in the embodiment of FIG. 15, as being positioned in the first through the fourth rows of keys, other embodiments can be arranged differently. For example, according to an embodiment, special operation keys 302 are provided only in the first through the third rows, substantially as described with reference to FIG. 14. According to another embodiment, a special operation key 302 is provided in the fifth row, with the function keys, and according to a further embodiment, the space bar is divided into two space bars, with a special operation key positioned between.

As shown in FIG. 15, the special operation keys 302a, 302b, 302c, and 302d are shown in FIG. 15 as being, respectively, the Delete, Backspace, Escape, and Insert keys. According to other embodiments, the keys are configured to activate different functions including, e.g., Alt, Tab, Page Up, Page Down, and Shift. According to an embodiment, software is provided with the keyboard 300 by which the operator can assign any selected function to each of the special operation keys 302. Additionally, the operator can reassign other keys of the keyboard to correspond to any selected function. So, for example, if the special operation key 302a is configured to operate as the delete key, the key that would normally operate as the delete key can be reassigned to provide some other function, such as a toggle key to switch the keyboard from a standard QWERTY configuration to a Dvorak configuration, or from an English-language keyboard to a foreign language keyboard arrangement.

In the embodiment of FIG. 15, the special operation keys 302 are substantially the same width as the standard keys of the keyboard 300. According to other embodiments, the special operation keys can be narrower or wider than the standard keys, and can be positioned at the same height as the standard keys, or can be raised or lowered relative to the standard keys.

The special operation keys 302 are described as being in a column. While the term column typically refers to elements that are substantially aligned one above another, the keys of a computer keyboard are not so aligned. Thus, on such a keyboard, it is not possible to designate a key from each of a plurality of successive rows as being substantially aligned, nor is it possibly to open an equal space in each of a plurality of successive rows so that all of the spaces are substantially aligned. Accordingly, as used in the claims, the term column is to be construed with sufficient breadth as to read on a plurality of keys positioned in successive rows of a keyboard in which each one of the plurality of keys is separated in a lateral direction from any other of the plurality of keys positioned in an adjacent row by a distance that is less than a width of a key that is in the same row with and immediately adjacent to the key in the adjacent row.

According to one embodiment, a switch key 304 is provided that is configured to toggle between a selected keyboard configuration and a toggle mode, in which the home-row keys correspond to numbers. For example, in the standard QWERTY arrangement, the keys of the home row correspond, from left to right, to the letters A, S, D, F, G, H, J, K, and L, colon/semicolon, and comma/quotation marks. By pressing the switch key 304, the first ten home-row keys are switched to correspond, respectively, to 1, 2, 3, 4, 5, 6, 7, 8, 9, and 0. In situations where the operator needs to enter a large quantity of numbers, toggling the switch key 304 enables faster and more accurate access to the number keys.

Furthermore, according to an embodiment, the arrangement of the numbers, while the keyboard is in toggle mode, can be modified to meet specific requirements. In many situations, a few numbers, such as, e.g., 1 and 2, are used far more frequently than the others. For example, in a table of contents of a book or document with 300 pages, most of the numbers will begin with a 1 or a 2. When entering the numbers, the operator can configure the home row so that the numbers 1 and 2 are in the positions of the J and F on a standard QWERTY keyboard, with the other numbers in remaining positions. An experienced touch typist can quickly habituate to such an arrangement, especially if it is used frequently. The switch key enables the operator to quickly toggle from normal operation to numbers and back again.

According to another embodiment, other functions can be assigned to toggle onto other keys while in toggle mode. For example, in many cases, symbols, such as $, % or # are frequently used in association with number entry. In such a case, the operator can select the $ and % symbols to toggle onto, e.g., the U and T keys when the switch key is toggled, enabling the operator to quickly access these functions while entering a series of numbers. In other cases, strings of characters, such as, e.g., "page number," or "Regular Price," are closely associated with number entry. In such cases, a selected key can be configured to toggle between a standard character and a string of characters, so that, while the operator is entering a series of numbers, specific strings of characters can be entered by the stroke of a single key.

Finally, where an operator frequently uses one or more specific strings of characters, keys of the home row as well as keys of other rows can be configured to toggle between standard operation and string entry. For example, in many fields of commercial and legal writing, computer programming, etc., many words or phrases are repeatedly used. Likewise, in technical and scientific writing, many technical terms and mathematical and chemical formulae having large numbers of characters are used repeatedly. In a situation where an operator expects to repeatedly encounter one or more of such terms or phrases while preparing a document, each phrase or term can be associated with a selected key of the keyboard, and when one of the terms is required, it can be entered by using three keystrokes—the switch key, to toggle the keyboard to string entry; the key associated with the required term; and the switch key again to toggle back to normal operation—instead of the much larger number of keystrokes that would otherwise be required.

According to an embodiment, a key marker 306 is provided, to assist an operator to locate a selected key by touch. The marker 306 raises the surface of the selected key so that the operator can easily find it by feel. The marker can be transparent, as shown in FIG. 15, or opaque, with another function label on its surface. Thus, where the operator merely wishes to locate (or avoid) a standard key that is difficult to accurately hit while typing at speed, a transparent marker can be placed on that key. On the other hand, where the operator wishes to reassign a particular key, an opaque marker can be placed on the reassigned key, with the new function printed or written on the marker. This helps the operator to not only see the position of the key, and avoid being confused by the factory marking, but also assists the operator to learn its position for touch typing. Key markers can also be used to temporarily or permanently mark keys that have been configured to perform selected functions while in toggle mode.

Figure 16:
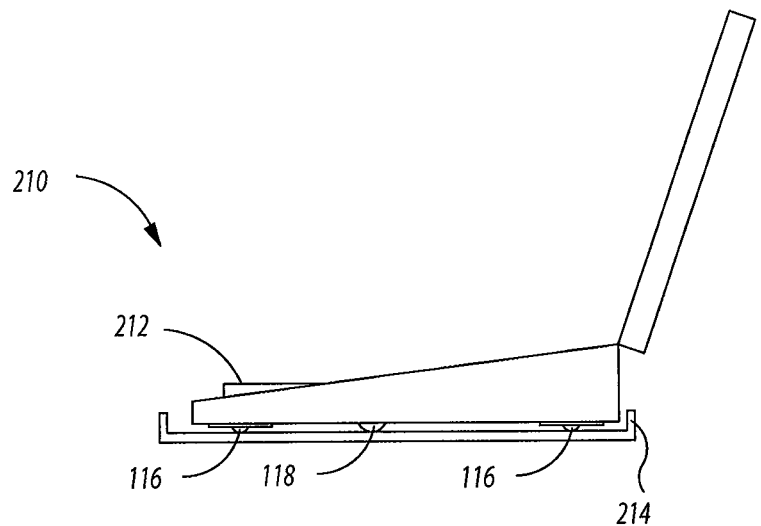

Referring to FIG. 16, a notebook computer 210 is shown in side view, according to an embodiment of the invention. The notebook computer 210 includes a wrist support pad 212 configured to receive a user's wrists, as described with reference to previous embodiments. The notebook computer 210 is provided with a plurality of friction reduction mechanisms 116 and a position tracking mechanism 118, for tracking movement of the notebook computer relative to an underlying surface, also as previously described. Accordingly, an operator may, by moving the notebook computer 210 over a smooth surface as previously described, control an onscreen pointer in a manner similar to that described with reference to previous embodiments. The notebook computer 210 may also be provided with a sliding tray 214 sized and configured to receive thereon the notebook computer, such that the device may be operated in environments where a smooth surface is not available.

It will be recognized that principles of the present invention may be employed in combination with known alternative keyboard configurations. For example, various ergonomically improved keyboard configurations are known. One such configuration has the groups of keys normally struck by the left and right hands divided and positioned at an angle relative to each other, to allow the operator's hands and wrists to rest in a more natural position. In another ergonomic configuration, the surface of the keyboard is generally curved to achieve a similar effect. In another configuration commonly known as Dvorak, the keys are arranged to maximize the use of the index and ring fingers, for improved efficiency over the more common QWERTY arrangement. Principles of the present invention may be applied with advantage to each of these configurations, as well as other such modifications.

Tests conducted by the inventor indicate that in many applications a movable keyboard provided with wrist support pads and direct pointer control enables a more efficient operation of the keyboard, with less wasted motion and lower stress to the hands and wrists.

While embodiments of the invention have been described generally with reference to controlling one or more pointers on a computer monitor while manipulating a keyboard, the principles of the invention may also be practiced with reference to any on-screen manipulation, including video games in conjunction with keyboards, consoles, joysticks, and the like, remote access or control of virtual or physical devices, etc.

Figure 17:
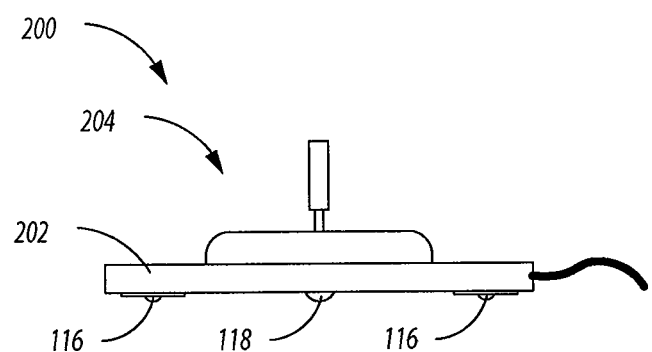

According to the embodiment of FIG. 17, a pointer control device 200 includes a housing 202 to which a joystick 204 is mounted. In operation, the pointer control device 200 provides a user with expanded capabilities, inasmuch as all the functions of a typical joystick device can be incorporated, together with the ability to track translation movement of the device 200 in two axes across an underlying surface, as described with reference to previous embodiments. Data signals from a tracking mechanism 118 may be transmitted to an associated game system. The game system may comprise a personal computer, a game console, a television, or other type of system.

While the illustrated embodiment shows a joystick, alternate embodiments may employ other types of game control input devices.

It will be recognized that, inasmuch as a typical joystick requires only one hand for operation, additional keys may be provided on the housing 202 for manipulation by the operator's free hand. Alternatively, a second pointer control device 200 may be provided for manipulation by the operator's other hand, and additional computer functions may be associated with signals from the second device 200, in a manner similar to that described with reference to FIG. 6.

According to an alternate embodiment (not pictured), a support base is provided and configured to operate with a standard joystick or other game controller to expand the available control, in a manner similar to that described with reference to FIGS. 7A and 7B.

Though described with reference to game control, the embodiment of FIG. 17, and alternate embodiments, may be used to control other types of systems, including industrial and military systems.

According to other embodiments of the invention, principles of the invention are practiced with other electronic devices, in particular, devices configured to be hand-held. For example, in one embodiment, a personal digital assistant (PDA) is provided with low-friction contact surfaces and surface tracking means on a back side thereof. Accordingly, the device may be placed on a surface and the operator can simply slide the device across the surface in various directions to provide control over various functions such as scrolling, pointers, menus, etc. In an alternate embodiment, at least one of the low-friction contact surfaces may also be responsive to pressure such that the operator is provided with a click function simply by pressing down with slightly increased pressure on the device.

It will be recognized that these features may be advantageously employed with a variety of small hand-held electronic devices including cellular telephones; portable game players; CD, DVD, and other digital media players; and pocket computers, etc.

Additionally, or alternatively, the tracking means may be configured to be manilulable by a user's hand or finger while holding the hand-held device, such that, with one or more fingers on the back of the device, the user can control functions of the device. Such tracking means may include, for example, a roller ball, an optical tracking device, a touch pad, a movable plate, etc.

In the disclosure of many of the embodiments of the invention, one or more wrist support pads are described. Unless explicitly limited, the use of terms such as "wrist" and "hand" in the description or claims is to be interpreted inclusively, as referring to a surface configured to receive any of a user's wrist, hand, heel of the hand, side of the hand, or combinations of the same. Additionally, use of terms such as "pad," "support pad," and "wrist support surface" does not limit the feature so described to cushioned structures, but may also be used in reference to surfaces appropriately sized or contoured to function as a wrist support.

The term computer keyboard is used in the specification and claims to refer to a device that includes a housing and a plurality of computer keys. Thus, unless specifically stated otherwise, a reference to a keyboard or computer keyboard is to be understood to include a housing with keys positioned on an upper surface thereof.

As used in the specification and claims, underlying surface refers to any substantially flat surface on which a computer or tracking device can be positioned for use, such as, e.g., a table or desk top, and is not to be construed as being a component of such a device. In particular, while it may be used in the claims to define claimed elements or components, an underlying surface is not to be construed as itself being a component of a claimed device unless positively recited as such.

With an operator positioned to type on a keyboard, a row of keys is a plurality of keys aligned laterally, so that the row extends left and right, as viewed by the operator. A row that is closer to the operator than a second row can be described as being in front of the second row, while the second row is behind the first row.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer keyboard, comprising:
   a housing;
   a first plurality of keys positioned on the housing and arranged for access by a user's left hand;
   a second plurality of keys positioned on the housing and arranged for access by a user's right hand; and
   a plurality of special operation keys arranged in a column on the housing between the first plurality of keys and the second plurality of keys, each of the special operation keys having a height that is different from a height of any of the first and second pluralities of keys positioned in a same row with the respective special operation key.

2. The keyboard of claim 1 wherein each of the plurality of special operation keys has a height that is greater than a height of any of the first and second pluralities of keys positioned in the same row with the respective special operation key.

3. The keyboard of claim 1 wherein each of the plurality of special operation keys has a height that is less than a height of any of the first and second pluralities of keys positioned in the same row with the respective special operation key.

4. The keyboard of claim 1 wherein each of the plurality of special operation keys that is positioned behind another of the special operation keys of the column has a height that is greater than a height of any of the other of the special operation keys.

5. The keyboard of claim 1 wherein each of the plurality of special operation keys is configured to activate a function selected from among: Esc, Back Space, Tab, Shift, Ctrl, Alt, Delete, Insert, Home, End, Page up, and Page down.

6. The keyboard of claim 1 wherein each of the plurality of special operation keys is configured to activate a standard keyboard function.

7. The keyboard of claim 1 wherein a function activated by each of the plurality of special operation keys is selectable by an operator.

8. A computer keyboard, comprising:

a housing;

a plurality of keys positioned on the housing and arranged for access by a user, and including a home-row of keys a majority of which correspond to letters of the alphabet; and a toggle key configured such that when the toggle key is struck, selected ones of the home row of keys are reconfigured to correspond to numbers, and that when the toggle key is struck again, the keys are reconfigured to their original configuration.

9. The keyboard of claim 8 wherein keys of the home row correspond to the letters A, S, D, F, G, H, J, K, and L.

10. The keyboard of claim 8 operation of the toggle key is controlled by software provided with the keyboard and executed by a computer processor to which the keyboard is coupled.

\* \* \* \* \*